May 2, 1939.  F. G. LEAVENWORTH  2,156,917
MEASURING AND DISTRIBUTING MACHINE
Filed March 6, 1936   7 Sheets-Sheet 1

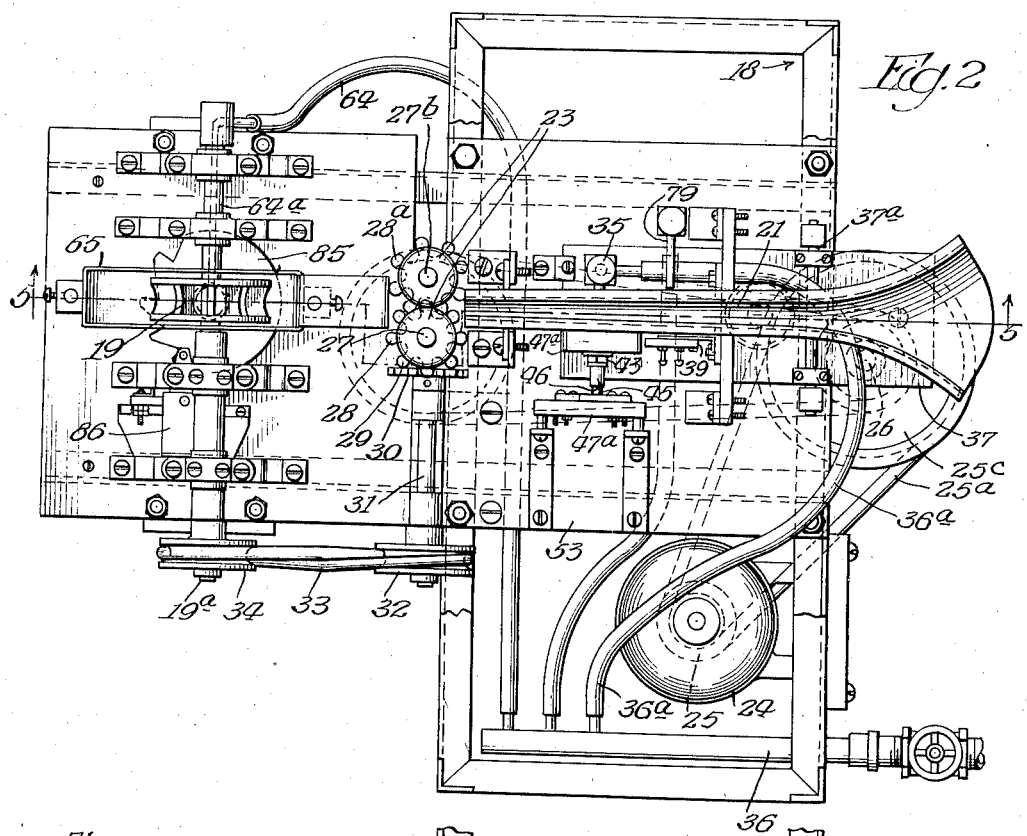

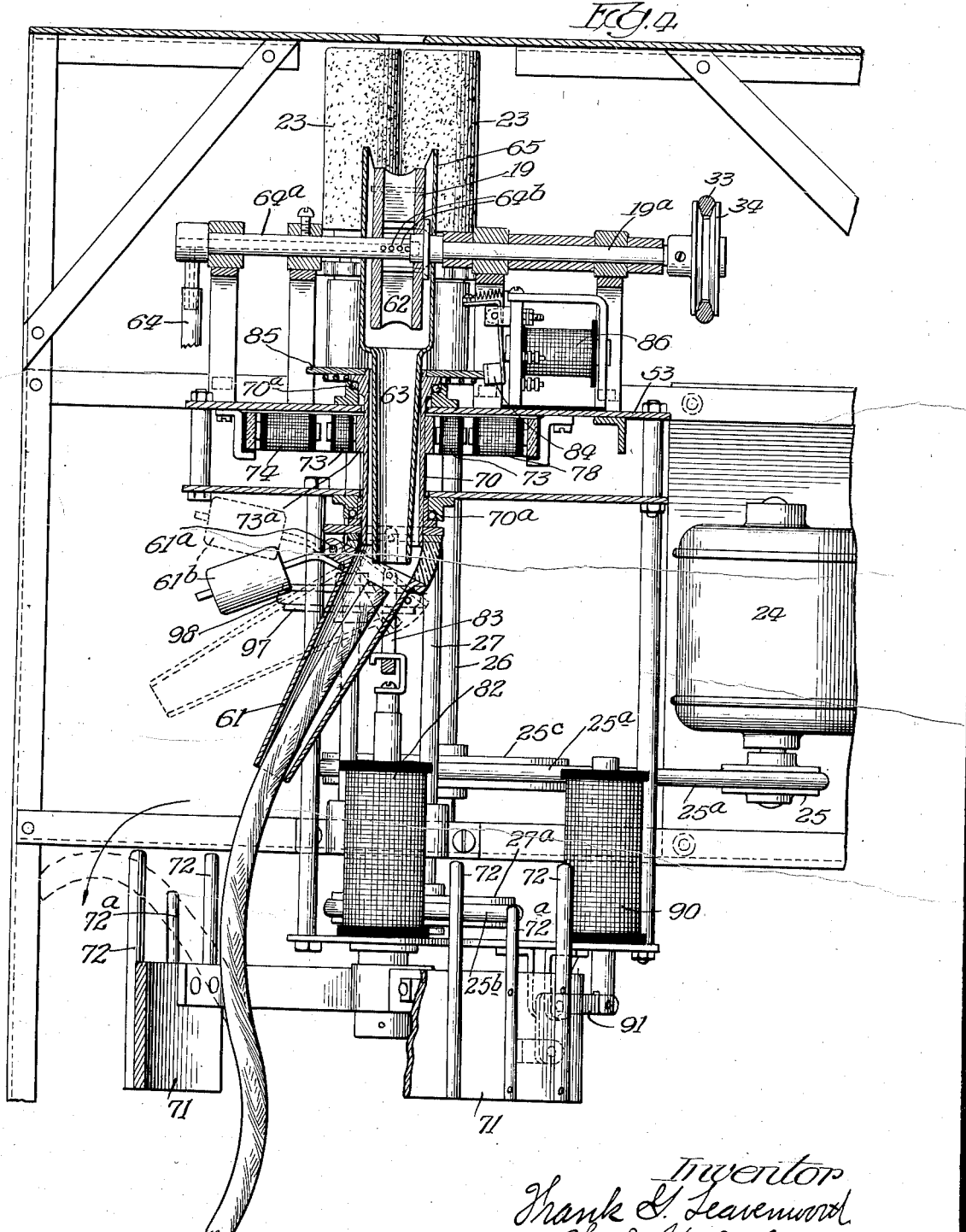

May 2, 1939. F. G. LEAVENWORTH 2,156,917
MEASURING AND DISTRIBUTING MACHINE
Filed March 6, 1936 7 Sheets-Sheet 4
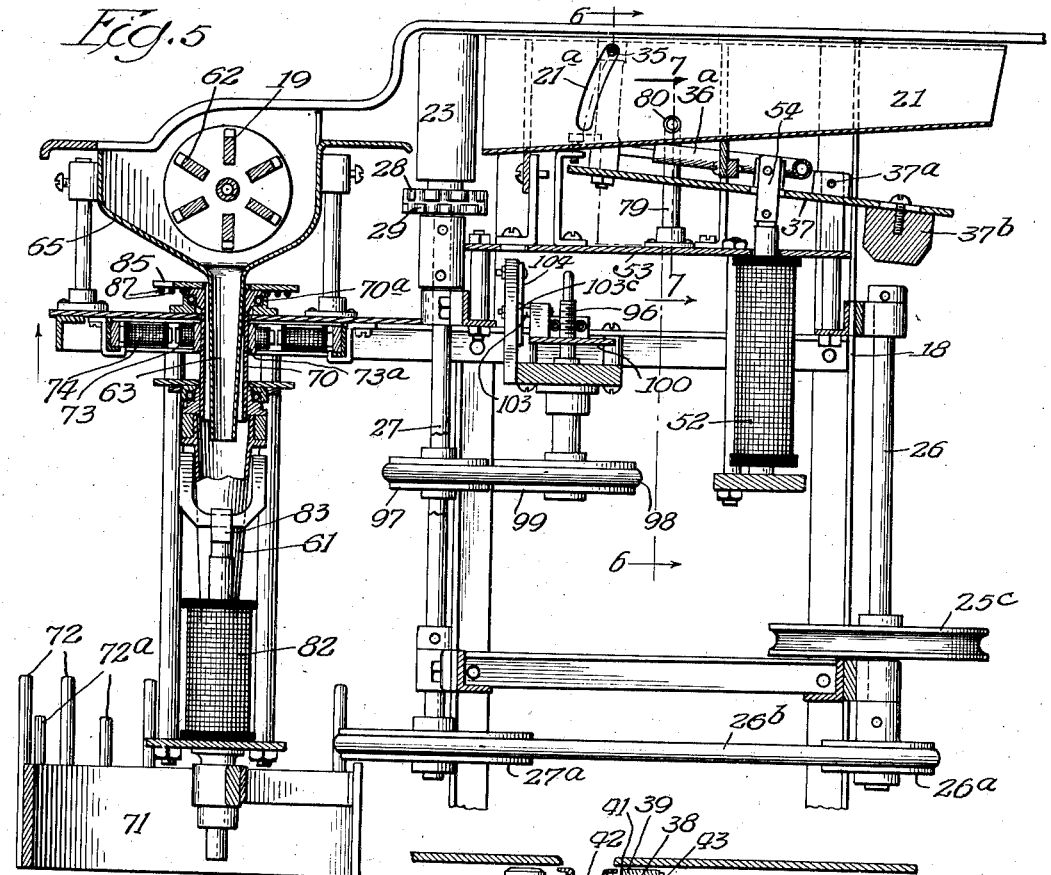
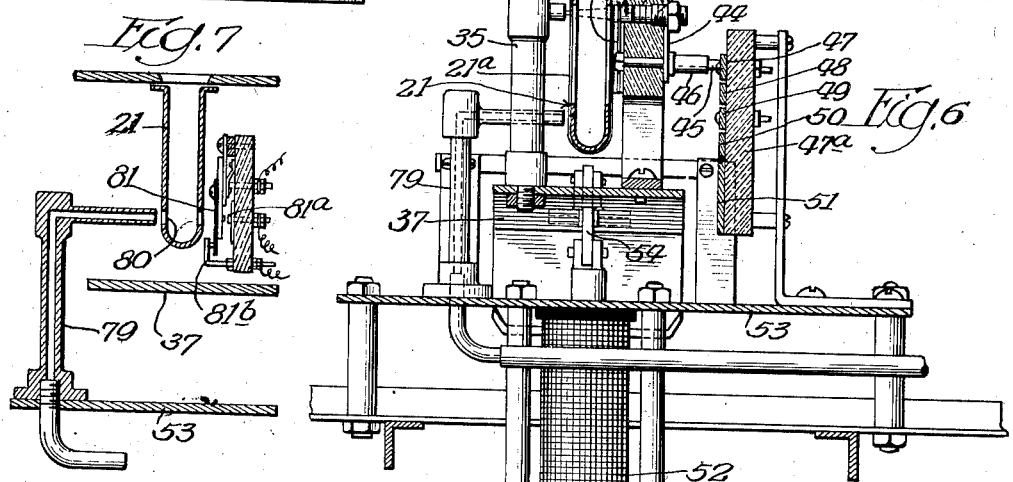
Inventor
Frank G. Leavenworth
By Fred Gerlach
Atty May 2, 1939.　　　F. G. LEAVENWORTH　　　2,156,917
MEASURING AND DISTRIBUTING MACHINE
Filed March 6, 1936　　　7 Sheets-Sheet 5

May 2, 1939. F. G. LEAVENWORTH 2,156,917
MEASURING AND DISTRIBUTING MACHINE
Filed March 6, 1936   7 Sheets-Sheet 6
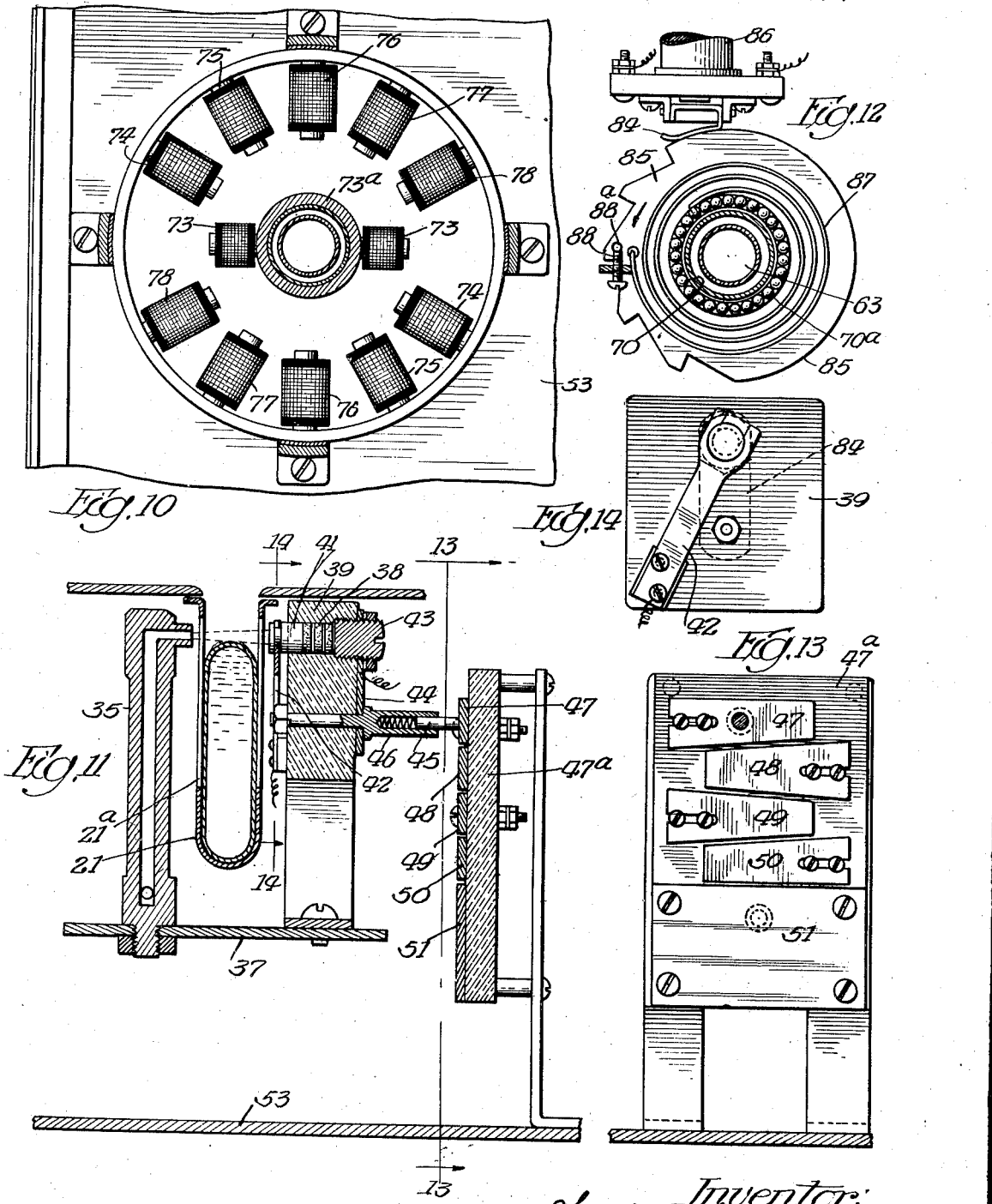

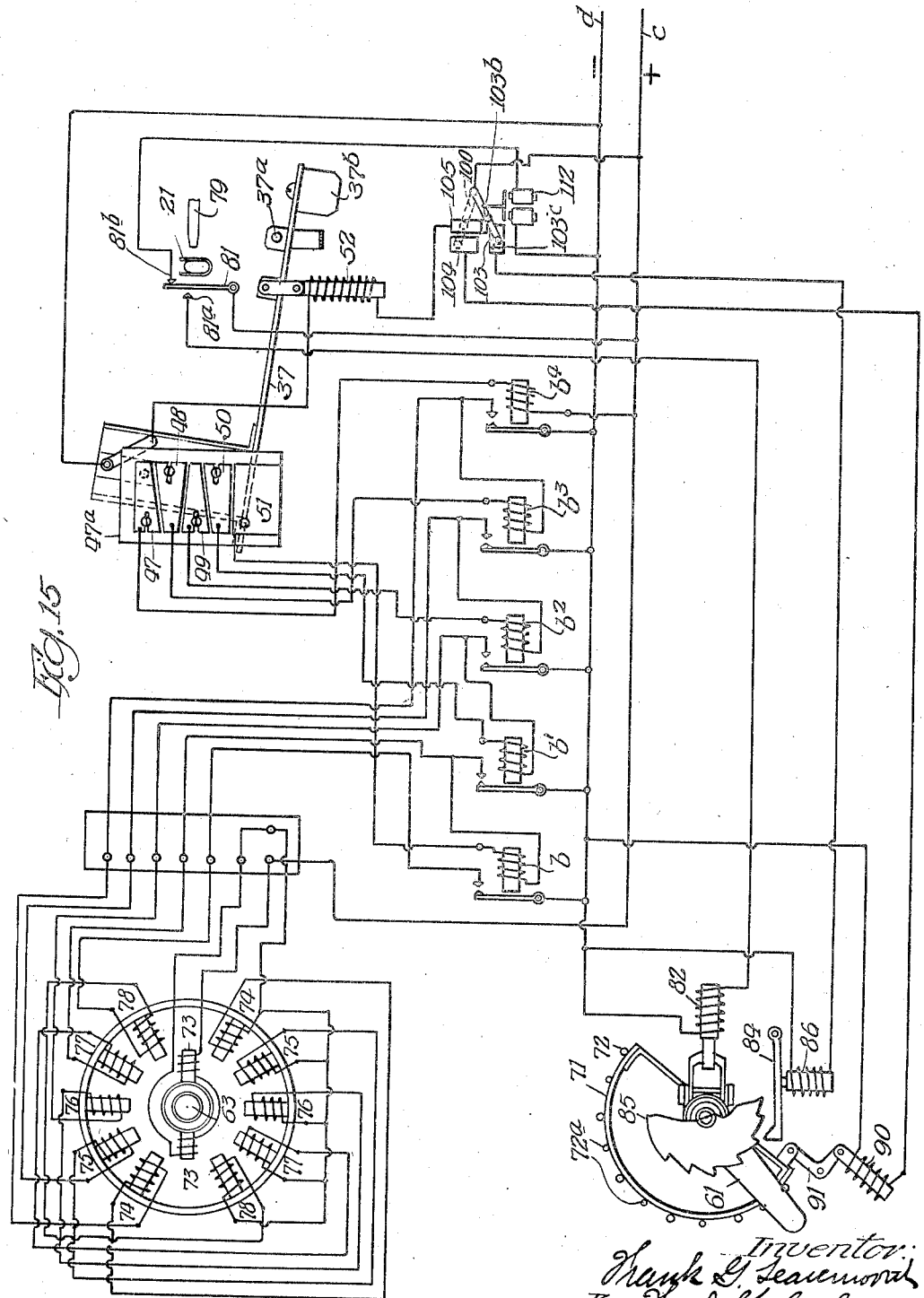

Patented May 2, 1939

2,156,917

UNITED STATES PATENT OFFICE 2,156,917

MEASURING AND DISTRIBUTING MACHINE

Frank G. Leavenworth, Oak Park, Ill., assignor, by mesne assignments, to Packers Machinery Company, Chicago, Ill., a corporation Application March 6, 1936, Serial No. 67,466

25 Claims. (Cl. 209—75)

The invention relates to improvements in measuring articles, such as intestines, and distributing them according to their dimensions.

One object of the invention is to provide an improved apparatus for determining or measuring the diameter of articles, such as intestines, and sorting or distributing them according to their diameters.

Another object of the invention is to provide a machine for this purpose which comprises variable electrical resistance means for controlling the measuring and distributing mechanism.

Another object of the invention is to provide improved mechanism for sorting intestines according to their lengths.

Another object of the invention is to provide improved mechanism for measuring the diameter of the intestines with rotary means for distributing or sorting the intestines according to their diameters.

Another object of the invention is to provide an improved intestine-sorting machine, which has a high capacity and is efficient in operation.

Other objects of the invention will appear from the description.

The invention consists in the several novel features which are hereinafter set forth and are more particularly defined by claims at the conclusion hereof.

In the drawings:

Fig. 2 is a plan.

Fig. 3 is a horizontal section taken on line 3—3 of Fig. 1.

Fig. 4 is a transverse section on line 4—4 of Fig. 1.

Fig. 5 is a longitudinal section taken on line 5—5 of Fig. 2.

Fig. 6 is a transverse section on line 6—6 of Fig. 5.

Fig. 7 is a transverse section on line 7—7 of Fig. 5.

Fig. 10 is a plan, parts being shown in section, of the electromagnetic mechanism for rotating the distributor chute according to the diameter of the intestines.

Fig. 11 is an enlarged vertical transverse section through the intestine trough and the swinging beam which carries the hydraulic jet and variable resistance means for controlling the vertical movement of the beam in response to variations in the diameters of the casings.

Fig. 12 is a plan of the ratchet mechanism for arresting the rotary distributor against retraction until the intestine has been distributed.

Fig. 13 is a detail of the series of switch-contacts across which the contact on the swinging beam operates to control the step-by-step movement of the distributor chute.

Fig. 14 is a detail of the spring-contact of the variable resistance means for controlling the distributing apparatus according to variations in diameter of the intestines.

Fig. 15 is a diagram of the electrical connections for the electrically operated apparatus.

Figure 1:
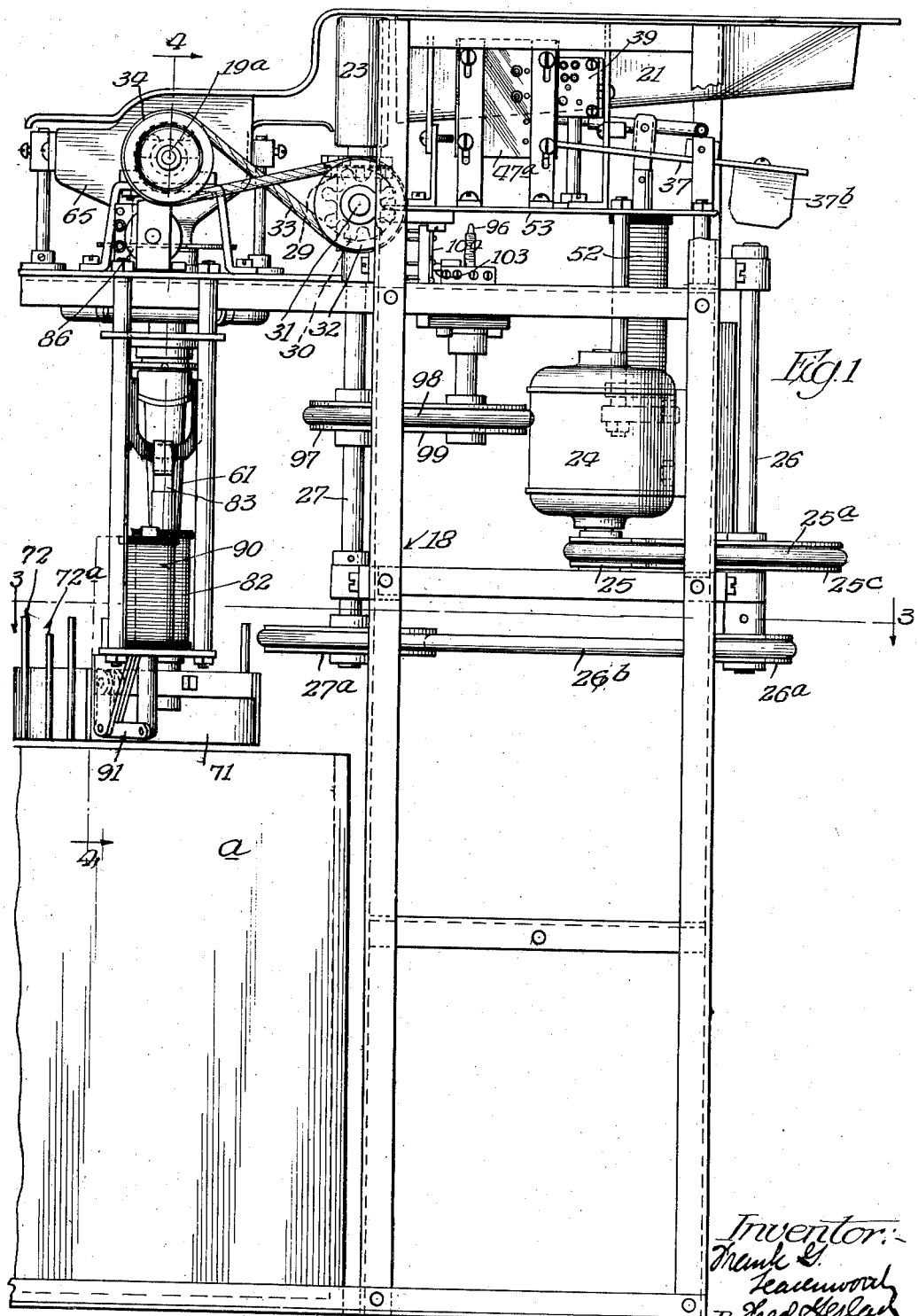
Fig. 1 is a side elevation of a machine embodying the invention.

The invention is exemplified in a machine or apparatus which comprises a suitable supporting frame 18 upon which the measuring and distributing devices are mounted; a stationary trough 21 carried by the frame and adapted to guide an intestine which has been distended or filled with water and contract it laterally and expand it vertically as it is fed longitudinally through the trough; a pair of vertical rubber-covered combined feed and squeezing rolls 23 which are adapted to draw the intestine through the trough and to squeeze it so as to prevent the flow of water in the intestines forwardly of the rolls; a propeller-wheel 19 for drawing the intestine away from the feed rolls 23; and an electric motor 24 for driving feed rolls 23 and wheel 19. Rolls 23 are driven from motor 24 through speed-reducing means which comprise a grooved pulley 25 on the motor shaft, a belt 25$^a$ driven by pulley 20, a pulley 25$^c$ driven by belt 25$^a$ and fixed to a vertical shaft 26, a pulley 26$^a$ on the lower end of shaft 26, a belt 26$^b$ driven by pulley 26$^a$, a pulley 27$^a$ driven by belt 26$^b$ and fixed to the lower end of the vertical shaft 27 of one of the rolls 23. The other roll 23 is driven by a gear 28 which is fixed to shaft 27 and engages a gear 28, which is fixed to the shaft 27$^b$ of said other roll.

Wheel 19 is fixed to a transverse shaft 19$^a$ (Fig. 2) which is journaled in bearings carried by the frame 18. Said shaft is driven from a gear 29 which is fixed to shaft 27 by a gear 30 which meshes with gear 29 and is fixed to a transverse shaft 31, a pulley 32 fixed to shaft 31, a crossed belt 33 driven by pulley 32 and a pulley 34 fixed to shaft 19$^a$ of the propeller 19 and driven by belt 33.

The diameter of the intestine as it passes through trough 21 is distended by filling a sufficient portion of its length with a suitable liquid such as water. One end of the intestine is then held or tied closed and placed into the bite of the feed rolls 23. These rolls squeeze the intestine so that the water therein will be forced to travel backwardly in the intestine as the latter is fed forwardly and force the water in the portion of the intestine rearwardly of the feed rolls while the intestine is passing through the trough. The width of the trough 21 is considerably narrower than the smallest diameter of the intestines handled, so that it will be contracted horizontally and extended vertically. As the intestine is thus distended and confined in the trough, the height of the intestine will be varied proportionately to its diameter.

A hydraulic jet 35 is disposed to project a stream through arcuate slots 21ª in the walls of, and transversely across, the trough to control the operation of electrical variable resistance means and switches for controlling the operation of the distributing means for the intestine. Jet 35 is constantly supplied with a stream of water under pressure from a supply pipe 36 through a flexible hose 36ª. An electric variable resistance device is operable by the hydraulic stream from jet 35 and comprises a carbon pile (Fig. 6), or series of carbon disks 38, which are carried in a socket formed in a block 39 of insulating material, and a plunger 41 slidably guided in said socket with its inner end positioned in the path of the stream of water from jet 35 and its other end adapted to compress to reduce the electrical resistance of the pile. Current is carried to the plunger 41 by a spring conductor strip 42 which is mounted on block 39 and normally presses the plunger 41 to relieve the carbon pile of pressure. This carbon pile is adapted by the pressure of the stream against plunger 41 to vary the electrical resistance of the pile and correspondingly vary the ampere flow of current from conductor 42 through plunger 41 and the carbon pile to a conductor-screw 43 which is confined in block 39 and to which is connected a conductor-strip 44. Jet 35, the variable resistance device, and block 39, are mounted on a beam 37 which is pivoted to the frame 18 at 37ª and is provided with a counterweight 37ᵇ so that the beam will be freely tiltable to raise and lower the jet and said device to the plane of the top of the intestine in the trough. Arcuate slots 21ª in the sides of the trough 21 permit the stream from jet 35 to be projected across the trough against the variable resistance device. A spring-pressed plunger-contact 45 is carried in a socket 46 which is electrically connected to conductor strip 44 and secured in the block 39. Contact 45 is adapted to move vertically across a series of contacts 47, 48, 49, 50 and 51 to control the distributor mechanism step-by-step, as hereinafter described. A stationary solenoid magnet 52 mounted under a plate 53 of frame 18 has its armature connected, by means of a link 54, to pull the beam 37 which carries the jet 35 and the variable resistance device downwardly to lower the contact 45 for its successive engagement with switches 47, 48, 49, 50 and 51, respectively, according to the diameter of the intestine in the trough. Counterweight 37ᵇ is adapted to normally raise the end of the beam 37, which carries the jet 35 and the variable resistance device. The operation of the beam 37 to control the circuit through contact 45 and contacts 47 to 51 will be as follows: Normally the weight 37ᵇ will hold the jet 35 and the variable resistance device in raised position, so the projected stream from jet 35 through the upper end of slot 21ª in the trough will be above the plane of the top of the largest intestine to be measured. Initially the stream from jet 35 will be impacted against the conductor plunger 41 with sufficient force to compress the carbon pile 38 to reduce its resistance and permit current in sufficient amperage to flow therethrough so that magnet 52 will be energized by current from conductor-strip 42 and plunger 41 through the carbon pile 38, screw 43 and conductor strip 44. When the magnet 52 is thus energized it will, through its armature and link 54, swing the beam 37 and lower the jet 35 and the block 39 which carries the contact 45. When the jet is lowered so it will be partially interrupted by the top of the intestine moving through trough 21, the force of the stream against plunger 41 will be decreased so that spring-contact 42 will move plunger 41 to relieve the carbon pile of pressure sufficiently to increase its resistance and reduce the amperage flow therethrough to cause magnet 52 to discontinue the lowering movement of the beam 37. The weight 37ᵇ on the beam 37 is then sufficient, when one-half of the stream is interrupted by the intestine, to balance the pull of magnet 52 to hold the beam balanced so the beam 37 will be arrested. Magnet 52 will thus become ineffective to lower the beam after the jet 35 has been lowered to the point where one-half of its stream is interrupted by the intestine. This mechanism, through the movement of contact 45, serves to measure the diameter of the casing and position the contact 45 which is carried by the beam responsively to the diametric measurement of the intestine.

Contact 45 will successively establish circuits for controlling, through contacts 47 to 51, inclusive, the distribution of the intestines according to their diameters as hereinafter described. This exemplifies measuring means for the diameters of casings controlled by a jet and an electric variable resistance device.

Propeller-wheel 19 is located beyond the feed rolls 23 to draw the intestines from the feed rolls and deliver them into a rotatable and tiltable distributing spout 61 and consists of sides with intermediate radial vanes 62. The vanes exert sufficient pull on the intestines to direct them downwardly. A constant stream of water is supplied through a hose 64 to a pipe 64ª which is concentric with wheel 19 and provided with spray openings 64ᵇ for discharging water outwardly between the spokes of the wheel 19 onto the intestines. A casing 65 is provided for wheel 19 and has a discharge nozzle 63 leading from its bottom to the distributor spout 61. The water discharged by the pipe 64ª through the spokes of the wheel 19 prevents the intestine from adhering to the wheel and insures its downward passage through nozzle 63 and into the spout 61, through which the water is discharged. Spout 61 is disposed over a tank a for the intestines. This mechanism draws the leading portion of the intestine from the feed rolls after it has been measured and discharges it through the distributing spout 61 with means for flowing water into tank a.

Spout 61 is carried by a sleeve 70 which is journaled in anti-friction bearings 70ª around the discharge nozzle 63 and extends obliquely from the lower end of sleeve 70. Rotation of the sleeve 69 and spout 61 responsive to diametric measurements of the casings, distributes their trailing ends according to diameters over a rack 71 (Fig. 3) which is provided with upstanding posts 72 for separating said ends of the intestines of different diameters. Rotation of the chute with sleeve 70, brings the spout into positions between different posts 72.

The mechanism for rotating the distributor spout responsively to the diametrical measurements, comprises a pair of electromagnets 73 which are fixed to a ring 73ª which is rigid with the sleeve 70 and a series of pairs of stationary coacting magnets 74, 75, 76, 77 and 78 (Fig. 10). These pairs of magnets are actuated by circuits which are controlled by contacts 47, 48, 49, 50 and 51, respectively. When the beam 37 is arrested by the interruption of the stream from jet 35 by the largest diameter of casing to be handled, as hereinbefore described, the beam will be positioned so that contact 45 will engage contact 47 and establish a circuit for energizing magnets 73 and magnets 74 so that rotatable magnets 73 will be attracted by magnets 74 until they are axially aligned. This rotation of magnets 73 will rotate sleeve 70 and spout 61 to position the spout for distribution of the trailing ends of the intestine between the posts 72 for intestines of the largest diameter on the rack 71. When the intestine is of the next smaller graded diameter, the beam 37 will be arrested as the result of the interruption of the stream from jet 35 so as to bring beam-contact 45 in engagement with contact 48, whereupon a circuit will be established through magnets 75 to attract the magnets 73 and rotate the spout 61 an additional step to distribute the trailing end of the intestine according to its diameter. When the beam 37 is retarded by the interruption of the stream from jet 35 by the next smaller diameter of intestine, contact 45 on the beam will engage contact 49, whereupon a circuit will be established through magnets 76 to attract magnets 73 another step, which will position the spout 61 for the distribution of the corresponding diameter of the intestines. When the intestine is of the next smaller diameter, beam 37 will be arrested where the beam-contact 45 will engage contact 50 to establish a circuit for energizing magnets 77, which will attract the magnets 73 and swing the spout 61 an additional step and into position for distributing the corresponding diameter of intestines. When the beam is arrested by the interruption of the stream from jet 35 for the smallest diameter of intestine, beam 37 will be swung into position to cause beam-contact 45 to engage contact 51, whereupon a circuit will be established for energizing magnets 78 to attract magnets 73 and rotate spout 61 another step and into position for distribution of the casing according to its diameter. Contacts 47, 48, 49, 50 and 51 are secured upon a block 47ª by screws and slots. These contacts are wedge-shaped so that, by longitudinal adjustment, the contacts may be shifted relatively to the movement of beam-contact 45 to vary the points at which the successive steps of the spout 61 will occur to vary the classification of the intestines according to predetermined diameters. This exemplifies electromagnetically operated rotary means for operating the distributor-spout for classifying the intestines according to their diametric measurements.

A dog 84 is adapted to engage a ratchet 85 (Fig. 12) which is fixed to rotate with the sleeve 70 and the distributor-spout 61 and holds the spout as it is rotated step-by-step to prevent it from retracting in the event the casing decreases in diameter in the direction of its following end. A magnet 86 is connected to release dog 84 and permit the spout 61, sleeve 70, ratchet 85, and magnets 73 to be retracted to their starting position after the intestine has been distributed by a spring 87. An adjustable fixed stop 88, which is engaged by a stop-pin 88ª when dog 84 is released, arrests spout 61, sleeve 70, ratchet 85 and magnets 73 in their normal or starting position.

At the end of each measuring operation and before the end of the casing passes through the spout 61, the latter is swung laterally to deflect the trailing end of the intestine over the rack 71 and between the posts 72 according to the diameters of the intestines. This operation is automatically controlled by a jet 79 which is adapted to discharge a stream of water through openings 80 in trough 21. This jet is disposed adjacent the bottom of trough 21, and where its stream will be interrupted by the intestines until their trailing ends are advanced beyond said openings by feed rolls 23. When said ends pass beyond said openings, the stream from jet 79 is projected through the trough 21. This stream from jet 79 operates a switch 81 which engages a contact 81ª as soon as the trailing end of the intestine has passed the openings 80 in the trough 21. Switch 81 and contact 81ª control a circuit for solenoid magnet 82, the armature of which is connected to a link 83 to distributor-spout 61. The latter is pivoted at 61ª to the lower end of sleeve 70. A weight 61ᵇ is attached to the spout to hold it in, and return it to, its normal position (Fig. 4) when magnet 82 is deenergized. When the trailing end of an intestine of any diameter passes the openings 80 in the trough 21, the stream from jet 79 will close switch 81 against contact 81ª and establish a circuit for energizing magnet 82 which will then swing the distributor-spout 61 outwardly, as shown by dotted lines in Fig. 4, to throw the trailing end of the casing over the rack 71 and between posts 72, according to the diameter of the intestine and while the spout remains in the position into which it has been rotated by the measuring mechanism and while it is held by dog 84.

Figure 8:
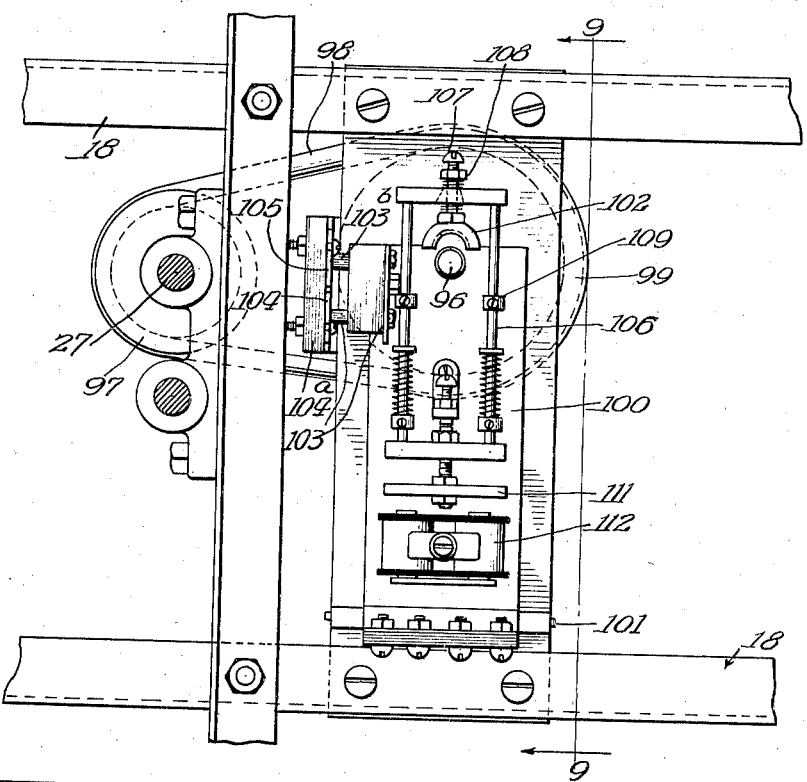
Fig. 8 is a plan of the mechanism for controlling the rack of the distributing mechanism for separating the trailing ends of short from long intestines.
Figure 9:
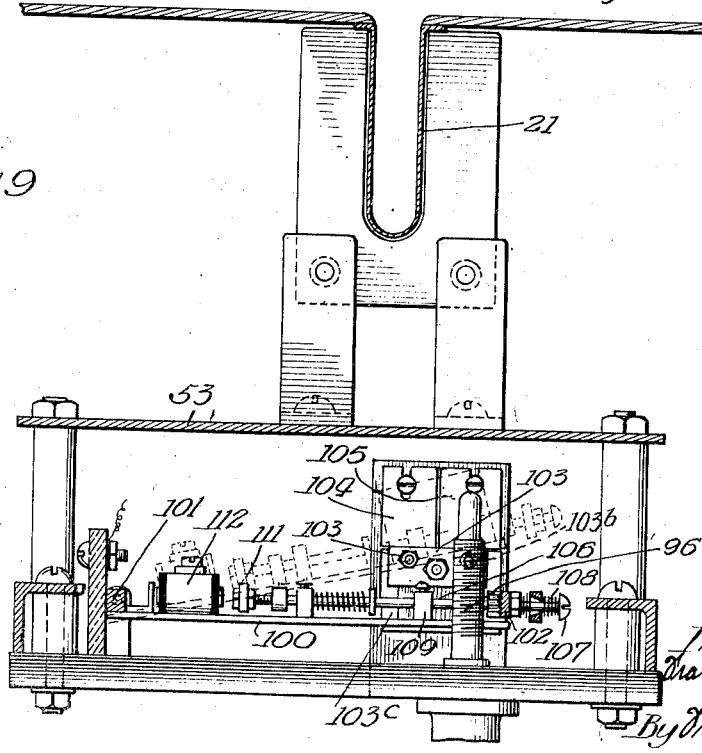
Fig. 9 is a section on line 9—9 of Fig. 8.

Mechanism is provided, for shifting the rack 71 which is rotatable to cause the spout 61 to classify or distribute short or long casings by lapping their trailing ends in different positions over the rack. This mechanism comprises an electromagnet 90 (Figs. 1, 4 and 15) which is connected to the rack by a lever 91 to swing the rack relatively to the distributor-spout so the latter, in its movement to lap the trailing end of the intestine, will lap the end of a long intestine over the rack 71 at one side of intermediate posts 72ª on the rack, and a timing-device for controlling the operation of magnet 90 so it will be actuated only by a long intestine. This timing-device comprises a screw-shaft 96 (Figs. 8 and 9) which is driven from shaft 27 which is driven by motor 24. A pulley 97 is fixed to shaft 27 and drives a belt 98 which drives a pulley 99 which is fixed to the screw-shaft 96. A switch-lever 100 is pivotally supported at 101 and carries a semicylindrical shoe 102 which is provided with a screw-thread adapted to engage the screw on shaft 96 to lift the lever 100 and the parts mounted thereon. Said lever carries switch-contacts 103, 103ᵇ. Contact 103 normally engages a contact 103ᶜ and when lever 100 is raised sufficiently, engages a contact 104. Contact 103ᵇ is normally free and when lever 100 is raised, engages a contact 105. Contacts 103ᶜ, 104, 105 are stationary and fixed to a block 104. Shoe 102 is pivotally and slidably movable in the end-bar of a frame 106 and is held therein so it will raise lever 100 by a screw 107 and springs 108. Frame 106 is adapted to couple the shoe 102 to screw-shaft 96. Frame 106 is slidably guided in lugs 109 on lever 100 and has connected thereto the armature 111 of a magnet 112 which is also carried by lever 100. When said magnet is energized it will attract armature 111 and shift frame 106 to engage shoe 102 with screw 96 to lift the lever 100 and contacts 103, 103$^b$. Magnet 112 is controlled by switch 81, which is normally held against a contact 81$^b$ when the stream from jet 79 is interrupted by an intestine in the trough. Switch 81 and contact 81$^b$ control the circuit through magnet 112 so that the contact lever 100 will move upwardly for periods or distances which vary according to the lengths of the intestines. When a short length of intestine, say six feet or somewhat less, travels through trough 21, switch 81 will engage contact 81$^b$ for an insufficient period to actuate magnet 112 so it will swing lever 100 to cause contact 103 thereon to engage stationary contact plate 104. Rack 71 is normally positioned so that the spout 61 will displace the end of the short intestine at one side of one of the intermediate posts 72$^a$ on the rack. If the intestine is greater than six feet in length, lever 100 will be lifted a sufficient distance to bring contact 103 into engagement with stationary contact 104 to close a circuit through the helix of magnet 90 which will, through lever 91, swing the rack 71 so that the distributor-spout will displace the end of the casing at the other side of one of the intermediate posts 72$^a$ of the rack. In consequence, the trailing ends of short intestines will be looped over the rack at one side of the intermediate posts 72$^a$ and long intestines of the same diameter will be looped over the rack at the other side of the same intermediate post. Both short and long intestines will be looped over the rack between the two posts 72 according to the diametrical dimensions of the intestines.

The helix of magnet 52, which lowers the beam 37, is included in a circuit through contact 105 which is adapted to be engaged by a contact 103$^b$ on the time-controlled lever switch 100. Contact 103$^b$ on said lever 100 is normally below the contact 105, so that the diameter-measuring mechanism will not operate until a short length, say two feet, of the intestine has passed the jet 35.

Magnet 86, which controls the dog 84 to release the spout 61 for retraction to its normal position, is included in a circuit controlled by jet-controlled switch 31 and contact 81$^b$ and switch-lever 100 which is normally positioned so its contact 103 engages stationary contact 103$^c$. When lever 100 is returned to its lowered position at the end of a distributing operation, switch-lever 100 will drop and magnet 86 will be energized to hold dog 84 released from ratchet 85 by the circuit through contacts 103, 103$^c$. When the lever 100 is lifted to bring its contact 103 off contact 103$^c$ and onto contact 104, the circuit through magnet 86 will be interrupted, so that dog 84 will engage ratchet 85 and hold it against retraction. A series of power-boosting magnets $b$, $b^1$, $b^2$, $b^3$ and $b^4$ is included in the respective circuits between the contacts carried by the beam 37 and the magnets for rotating the distributor-spout.

The electrical devices are connected by conductors and circuits as shown in Fig. 15.

The operation will be as follows:

The operator will place one end of an intestine, the leading portion of which has been filled with water, into the trough 21 and its leading end into the bite of the feed-rolls 23. The feed-rolls and propeller-wheel 19 will be continuously rotated by power from the motor 24 and advance the intestine through the trough 21. As the intestine first interrupts the stream from jet 79, switch 81 will close against contact 81$^b$, which will establish a circuit from line-conductor $c$ through switch 81, contact 81$^b$, magnet 112 and line-conductor $d$. Magnet 112 will shift frame 106 to couple the shoe 102 to the rotating screw 96 and this will start the upward movement of the time-controlled switch-lever 100, which will continue until the trailing end of an intestine passes the opening 80 in the trough 21 and the stream from jet 79 shifts switch 81 to disengage contact 81$^b$ from switch 81. Simultaneously a circuit will be established through contact 103$^c$, lever 100 and magnet 86 to hold the dog 84 disengaged from ratchet 85 until a predetermined length of an intestine, say four feet, has passed openings 80. The circuit through magnet 86 will then be interrupted when contact 103 leaves contact 103$^c$. If the length of the intestine is greater and less than another predetermined length, say six feet, contact 103 will pass contact 103$^c$ and cut out magnet 86 so that dog 84 will be released and engage ratchet 85. As the lever 100 is raised responsively to a minimum predetermined length of intestine, say two feet, contact 103$^b$ on lever 100 engages stationary contact 105 to establish a circuit through said lever and the solenoid 52 which operates the beam 37 and the variable resistance carried by said beam. Thereupon, the diameter-measuring mechanism will become effective. The stream from jet 35 carried by beam 37 which is held normally above the intestine by weight 37$^b$, will impact against the plunger 41 to compress the carbon pile 38 which will decrease the resistance in the circuit through magnet 52 sufficiently to increase the amperage flow through helix of magnet 52 to overcome the force of weight 37$^b$ and cause the magnet to swing the contact carrying end of the beam 37 downwardly until the stream from jet 37 is partially interrupted by the upper margin of the intestines. When the stream is thus interrupted, spring-switch 42 will release the pressure on the carbon pile 38. This will increase the resistance in the circuit for magnet 52 sufficiently so that the beam 37 will remain in balance at the point where approximately one-half of the stream is interrupted by the intestine. In this operation, contact 45, which is carried by the beam, will be lowered according to the diameter of the casing and will successively establish circuits through contacts 47, 48, 49, 50, 51 to successively energize magnets 74, 75, 76, 77 and 78 according to the extent which the beam 37 is lowered in accordance with the diametric dimension of the intestine. When the intestine is of the largest diameter, the beam will be arrested to establish a circuit from contact 45 through contact 47 and magnets 74. If the intestine is of the next predetermined diameter, beam 37 will continue to be lowered by magnet 52 and a successive circuit will be established through contact 48 and magnet 75. If the intestine is of the next predetermined diameter, the beam 37 will continue its descent until a successive circuit will be established through contact 49 and magnets 76. The next predetermined diameter will cause the beam 37 to be lowered to produce a successive circuit through contact 50 and magnets 77. The smallest diameter of casing will cause the beam to bring contact 44 into engagement with contact 51 to establish a circuit through magnets 78. The successive actuations of these magnets impart a rotative step-by-step movement to magnets 73, sleeve 70 and the distributor-spout 61 to bring the spout into positions for distributing or classifying the intestines according to their diameters between posts 72 on rack 71. The leading ends of the intestines will fall into the tank a.

When the trailing end of the intestine passes openings 80 in trough 21, the stream from jet 79 will be uninterrupted by the intestine, and switch 81 will be operated by the stream to interrupt the circuit through magnet 112 and establish a circuit through switch 81, contact 81ᵃ and magnet 82. This will cause the distributor-spout 61 to be swung vertically, as indicated by dotted lines in Fig. 4, to displace the trailing end of the intestine over the rack 71 after the spout has been shifted rotatively correspondingly to the diameter of the casing. If the intestine of one diameter is shorter than a predetermined length, say six feet, the contact 103 of lever 100 will not be lifted to engage stationary contact 104 and the displacing movement of the distributor-spout will be at one side of one of the intermediate studs 72ᵃ, while the rack 71 is in its normal position. If the length of the intestine of the same diameter is greater, the lever 100 will be raised to bring its contact 103 into engagement with contact 104 to establish a circuit through magnet 90 which will swing the rack 71 a sufficient distance to cause the distributor-spout to displace the trailing end of that intestine over the rack 71 at the other side of the same intermediate post 72ᵃ.

When the circuit through magnet 112 is interrupted at switch 81, shoe 102 will be disengaged from screw 96 and lever 100 will fall back to its normal position in readiness for a succeeding operation. When lever 100 is in its normal position, it will maintain a circuit through magnet 86 to hold dog 84 disengaged from ratchet 85. As the lever is lifted to disengage its contact 103 from stationary contact 103ᶜ, during the succeeding operation, magnet 86 will be deenergized to release dog 84 so it will serve to hold ratchet 85, the distributor-spout, sleeve 70 and magnets 73 against reverse rotation until the succeeding operation.

Tank a receives the intestines from the distributor-spout 61 before the spout is operated to lap the trailing ends of the intestines over the rack 71. The leading ends of the short and long casings are deposited in the tank a and the trailing ends are distributed between posts 72 according to their diameters and between the intermediate posts 72ᵃ and the adjacent posts 72 according to their length.

The invention exemplifies a machine for distributing intestines according to their diameters and according to their lengths, which is simple in construction, has a high capacity, and is efficient and automatic in its operation.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In apparatus of the character described, the combination of a trough, means for feeding an intestine through the trough, and means for measuring the diameter of the intestine, comprising variable electrical resistance means, fluid-pressure means for varying the electrical resistance, and means controlled by the diameter of the intestine for controlling the fluid-pressure means to vary the electrical resistance.

2. In apparatus of the character described, the combination of a trough, means for feeding an intestine through the trough, means for measuring the diameter of the intestine, comprising variable electrical resistance means, means for moving the resistance means transversely of the intestine, means controlled by the diameter of the intestine for varying the electrical resistance and a series of switches controlled by said resistance means, and distributing means for the intestine according to its diameter, controlled by the series of switches.

3. In apparatus of the character described, the combination of a trough, means for feeding an intestine through the trough, means for measuring the diameter of the intestine, comprising variable electrical resistance means, means for moving the resistance means transversely of the intestine, means controlled by the diameter of the intestine for varying the electrical resistance and electromagnetically operated distributing means for the intestine according to its diameter, controlled by the variable resistance.

4. In apparatus of the character described, the combination of a trough, means for feeding an intestine through the trough, means for measuring the diameter of the intestine, comprising variable electrical resistance means, means controlled by the diameter of the intestine for varying the electrical resistance and a series of switches, distributing means for the intestine according to its diameter, and electromagnets controlled by the switches, for operating the distributing means.

5. In apparatus of the character described, the combination of a trough, means for feeding an intestine through the trough, means for measuring the diameter of the intestine comprising a jet for a stream of fluid under pressure, means for moving the jet transversely across the plane of the intestine controlled by the diameter of the intestine and electrical means controlled by the movement of the jet, and distributing means for the intestine according to its diameter, controlled by said electrical means.

6. In apparatus of the character described, the combination of a trough, means for feeding an intestine through the trough, means for measuring the diameter of the intestine comprising a jet for a stream of fluid, means for moving the jet transversely of the intestine controlled by the diameter of the intestine and electrical means controlled by the movement of the jet, and distributing means for the intestine according to its diameter, controlled by said electrical means.

7. In apparatus of the character described, the combination of a trough, means for feeding an intestine through the trough, means for measuring the diameter of the intestine comprising a jet for a stream of fluid variable resistance means controlled by the jet electrical switch-means controlled by the electrical resistance, means for conjointly moving the jet and the switch means transversely of the intestine and distributing means for the intestine according to its diameter, controlled by said electrical switch-means.

8. In apparatus of the character described, the combination of a trough, means for feeding an intestine through the trough, means for measuring the diameter of the intestine comprising a jet for a stream of fluid, means for moving the jet transversely of the intestine and electrical means controlled by the interruption of the stream by the intestine and distributing means for the intestine according to its diameter, controlled by said electrical means.

9. In apparatus of the character described, the combination of a trough, means for feeding an intestine through the trough, means for measuring the diameter of the intestine comprising a jet for a stream of fluid movable across the plane of the margin of the intestine and variable electrical resistance means movable with the jet and controlled by the stream, and distributing means for the intestine according to its diameter, controlled by the movement of the jet and said electrical means.

10. In apparatus of the character described, the combination of a trough, means for feeding an intestine through the trough, means for measuring the diameter of the intestine comprising a jet for a stream of fluid, movable across the plane of the margin of the intestine, and variable electrical resistance means movable with the jet and controlled by the stream, switch-means comprising a series of contacts controlled by the movement of the resistance means, and distributing means for the intestine according to its diameter, controlled by said contacts.

11. In apparatus of the character described, the combination of a trough, means for feeding an intestine through the trough, means for measuring the diameter of the intestine comprising a jet for a stream of fluid, movable across the plane of the margin of the intestine, variable electrical resistance means controlled by the stream for shifting said jet and resistance means and an electromagnet controlled by said resistance means, and distributing means for the intestine according to its diameter, controlled by the movement of the jet and resistance means.

12. In apparatus of the character described, the combination of a trough, means for feeding an intestine through the trough, means for measuring the diameter of the intestine comprising variable electrical resistance means movable across the plane of the margin of the intestine and an electromagent for shifting the resistance means and controlled by its movement, and distributing means for the intestine according to its diameter, controlled by the movement of the resistance means.

13. In apparatus of the character described, the combination of a trough, means for feeding an intestine through the trough, means for measuring the diameter of the intestine comprising a vertically swinging beam, means movable with the beam for controlling its movement according to the diameter of the intestine, electrical switch-means controlled by said beam, and means for distributing the intestine according to its diameter, controlled by said switch-means.

14. In apparatus of the character described, the combination of a trough, means for feeding an intestine through the trough, means for measuring the diameter of the intestine comprising a vertically swinging beam, means comprising a jet for a stream of fluid, and variable resistance means, carried by the beam, for controlling the movement of the beam according to the diameter of the intestine, electrical switch-means controlled by said beam, and means for distributing the intestine according to its diameter, controlled by said switch-means.

15. In apparatus of the character described, the combination of a trough, means for feeding an intestine through the trough, means for measuring the diameter of the intestine, means for distributing the intestine according to its diameter, comprising a spout rotatable on a vertical axis and tiltable on a horizontal axis, means controlled by the measuring means for rotating the spout means for measuring the length of the intestine, and means controlled by the length of the intestine for tilting the spout.

16. In apparatus of the character described, the combination of a trough, means for feeding an intestine through the trough, means for measuring the diameter of the intestine, means for distributing the intestine according to its diameter, comprising a spout rotatable on a vertical axis a series of electromagnets for rotating the spout, and means controlled by the measuring means to vary the actuation of the number of magnets according to the diameter of the intestine means for rotating the spout.

17. In apparatus of the character described, the combination of a trough, means for feeding an intestine through the trough, means for measuring the diameter of the intestine, means for distributing the intestine according to its diameter, comprising a spout rotatable on a vertical axis, a series of electromagnets connected to rotate the spout step-by-step, and means controlled by the measuring-means for actuating the number of magnets according to the diameter of the intestine and adapted to rotate the spout step-by-step.

18. In apparatus of the character described, the combination of a trough, means for feeding an intestine through the trough, means for measuring the diameter of the intestine, means for distributing the intestine according to its diameter, comprising a spout rotatable on a vertical axis and a series of electromagnets controlled by the measuring means, for rotating the spout step-by-step.

19. In apparatus of the character described, the combination of a trough, means for feeding an intestine through the trough, means for measuring the diameter of the intestine, means for distributing the intestine according to its diameter, comprising a rotatable spout, a rack, and means for rotating the spout to position the trailing ends of intestines over the rack, and means for shifting the rack to distribute the trailing ends of the spout according to the length of the intestine.

20. In apparatus of the character described, the combination of a trough, means for feeding an intestine through the trough, means for measuring the diameter of the intestine, means for distributing the intestine according to its diameter, comprising a rotatable spout, a rotatable rack and means for shifting the spout to position the trailing ends of intestines over the rack, and means for shifting the rack to distribute the trailing ends of the spout according to the length of the intestine.

21. In apparatus of the character described, the combination of a trough, means for feeding an intestine through the trough, means for measuring the diameter of the intestine, means for distributing the intestine according to its diameter, comprising a rotatable spout and a rack, means for shifting the spout to position the trailing ends of intestines over the rack, and electromagnetic means for shifting the rack to distribute the trailing ends of the spout according to the length of the intestine.

22. In apparatus of the character described, the combination of a trough, means for feeding an intestine through the trough, means for measuring the diameter of the intestine, means for distributing the intestine according to its diameter, comprising a rotatable spout, a rotatable rack, and electromagnetic means for shifting the spout to position the trailing ends of intestines over the rack, and electromagnetic means for shifting the rack to distribute the trailing ends of the spout according to the length of the intestine.

23. In apparatus of the character described, the combination of a trough, means for feeding an intestine through the trough, means for measuring the diameter of the intestine, means for distributing the intestine according to its diameter, comprising a rotatable spout, a rack, and means for rotating the spout to position the trailing ends of intestines over the rack, means for shifting the rack to distribute the trailing ends of the spout according to the length of the intestine, and means comprising a jet for a stream of fluid, and switch-means for electrically controlling the shifting means for the rack.

24. In apparatus of the character described, the combination of a trough, means for feeding an article through the trough, means for measuring a dimension of the article comprising variable electrical resistance, fluid-pressure means for varying the electrical resistance, means controlled by the diameter of the intestine for controlling the pressure-means to vary the electrical resistance according to that dimension, means for distributing the articles according to said dimension controlled by said electrical means and means for automatically distributing the article according to another dimension.

25. In apparatus of the character described, the combination of a trough, means for feeding an article through the trough, means for measuring a dimension of the article comprising a jet for a stream of fluid under pressure, movable across the plane of the margin of the article, and variable electrical resistance means controlled by the stream, and distributing means for the articles controlled by said electrical means.

FRANK G. LEAVENWORTH.